US005404784A

United States Patent [19]

Steenbock

[11] Patent Number: 5,404,784

[45] Date of Patent: Apr. 11, 1995

[54] APPARATUS FOR MODIFYING THE PERCUSSIVE SOUND EMANATING FROM A DRUM

[76] Inventor: Daniel A. Steenbock, 78 Elm, Clintonville, Wis. 54929

[21] Appl. No.: 159,729

[22] Filed: Dec. 1, 1993

Related U.S. Application Data

[63] Continuation of Ser. No. 702,268, May 17, 1991, abandoned.

[51] Int. Cl.[6] .................. G10D 13/02; G10K 11/00; F16F 7/00

[52] U.S. Cl. .................. 84/411 M; 84/453; 181/185; 181/207

[58] Field of Search .................. 84/411 M, 453, 411 R, 84/415; 181/207, 208, 209, 185

[56] References Cited

U.S. PATENT DOCUMENTS

| | | | |
|---|---|---|---|
| 1,084,719 | 1/1914 | Wanamaker | 84/453 |
| 3,621,749 | 12/1971 | Aluisi | 84/411 M |
| 3,635,119 | 1/1972 | Thompson | 84/411 M |
| 3,951,032 | 4/1976 | LaPorta et al. | 84/411 M |
| 3,981,220 | 9/1976 | Clark | 84/415 |
| 4,037,508 | 7/1977 | Wolford | 84/415 |
| 4,102,235 | 7/1978 | Le Masters | 84/411 R |
| 4,154,137 | 5/1979 | Kobayashi | 84/411 R |
| 4,184,407 | 1/1980 | Townshend | 84/411 R |
| 4,246,825 | 1/1981 | Hodas | 84/411 M |
| 4,325,281 | 4/1982 | Hardy | 84/411 M |
| 4,329,905 | 5/1982 | Lloyd | 84/411 R |
| 4,338,850 | 7/1982 | Payson | 84/411 M |
| 4,373,419 | 2/1983 | Tuttrup | 84/411 R |
| 4,567,807 | 2/1986 | Robinson | 84/411 M |
| 4,745,839 | 5/1988 | Peraino | 84/411 M |
| 4,805,514 | 2/1989 | Billings | 84/411 M |
| 4,899,635 | 2/1990 | Santangelo | 84/411 M |

*Primary Examiner*—Michael L. Gellner
*Assistant Examiner*—Cassandra Spyrou

[57] ABSTRACT

An apparatus (32) for modifying the percussive sound emanating from a drum (10) includes a hollow skirt (34) having a first end (36) and a second end (38) that define openings (40) and (42) that are in opposition and communication with each other. The skirt (34) is generally configured to be conical or quasi-conical in shape, the first end (36) forming the base of the conical shape and the second end (38) forming the vertex. The opening (42) is large enough for a stand (24) upon which the drum (10) is mounted to pass through. The material or materials selected for the skirt (34) depends upon the desired tonal results of the apparatus.

9 Claims, 4 Drawing Sheets

APPARATUS FOR MODIFYING THE PERCUSSIVE SOUND EMANATING FROM A DRUM

CROSS-REFERENCE TO RELATED APPLICATION

This is a continuation of U.S. Ser. No. 07/702,268 filed on May 17, 1991 now abandoned.

FIELD OF THE INVENTION

This invention pertains generally to apparatuses such as drum mutes or muffles that modify the percussive sound that emanates from a drum.

BACKGROUND OF THE INVENTION

Drum mutes or muffles are used to dampen the sound emanating from a drum and are commonly used during practice sessions. U.S. Pat. Nos. 3,453,924 issued to Glick et al.; 3,635,119 issued to Thompson, deceased; 3,951,032 issued to LaPorta et al.; 3,981,220 issued to Clark; 4,102,235 issued to LeMasters; 4,154,137 issued to Kobayashi; 4,246,825 issued to Hodas; 4,325,281 issued to Hardy; 4,338,850 issued to Payson; 4,567,807 issued to Robinson; 4,745,839 issued to Peraino; and 4,899,635 issued to Santangelo are exemplary of the numerous different configurations and forms of drum mutes. Each of these patents shows a means for dampening the sound that emanates from a drum by some form of contact with one of the heads of the drum. Such contact with one of the heads affects the natural "feel" of the drum to the drummer. Thus, one who uses a drum mute or muffle during practice sessions may not be able to produce the desired sound during live performances without compensating for the differences in "feel."

Some apparatuses that modify the sound emanating from the drum may actually mar or otherwise affect the integrity of the drum. For example, U.S. Pat. No. 4,805,514 issued to Billings discloses a muffling device that is disposed within the drum itself by the cutting of an opening in the membrane of the bottom snare head. Another patent, U.S. Pat. No. 4,037,508 issued to Wolford, shows the mounting of a member within the drum shell to direct a moving air column toward the snare head to produce greater power and projection. Though the installation of this latter invention results in no disfigurement to the drum itself, the installation and removal of such a member is time-consuming and not suited toward quick and facilitated removal of such apparatus.

Accordingly, a need has existed for an apparatus that may be used to dampen or otherwise modify the sound emanating from a drum and that preserves the natural "feel" of the drum to the drummer. Further, a need has existed for an apparatus for modifying the sound emanating from a drum that may be quickly and easily attached to the drum and that does not mar or otherwise affect the integrity of the drum.

SUMMARY OF THE INVENTION

In accordance with the present invention, the apparatus of the present invention for modifying the percussive sound emanating from a drum comprises a hollow skirt having opposing first and second ends that define first and second openings, respectively. The first and second openings are in communication with each other. The first opening is sized to fit about the peripheral rim at the snare head of a drum. The first opening is preferably attached to the peripheral rim by use of an elastic band that borders the first opening and stretches around the peripheral rim to secure the skirt in tension to the drum. The second opening is large enough for a stand upon which the drum is mounted to pass through.

The skirt is generally configured to be conical or quasi-conical in shape, the first end forming the base of the conical shape and the second end forming the vertex. The material selected for the skirt depends upon the desired tonal results of the apparatus. Where the apparatus of the present invention is a drum muffling apparatus, the skirt is formed of a sound absorbent material, such as canvas, linen, velour, leather or suede, and synthetic leather.

An alternate embodiment of the skirt includes first and second sections, the first section being formed of a material that modifies sound in a manner different from the second section. The first section may, for example, be formed of a sound absorbent material and the second section formed of a material such as an open-mesh weave through which sound is readily transmitted therethrough, the skirt being positionable about the peripheral rim such that the sound from the snare head may be substantially directed through the second section in the direction that the second section faces.

Further objects, features and advantages of the invention will be apparent from the following detailed description taken in conjunction with the accompanying drawings.

DETAILED DESCRIPTION OF THE PREFERRED EMBODIMENT

Figure 1:
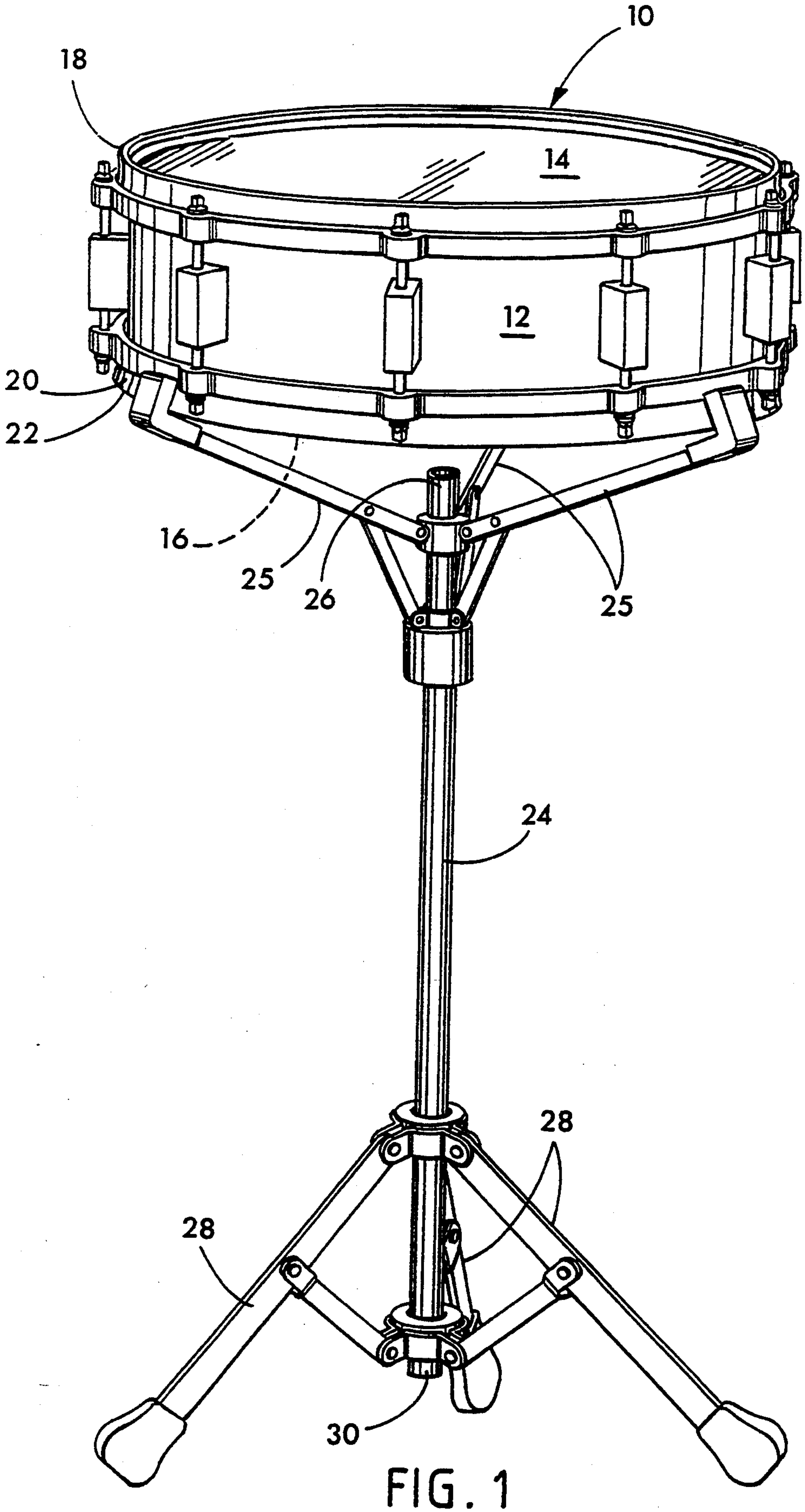
FIG. 1 is a perspective view of an exemplary snare drum which may be used with the apparatus of the present invention for modifying the percussive sound emanating from a drum.

With reference to the drawings, a drum of the snare type is shown generally at 10 in FIG. 1. The snare drum 10 generally includes a hollow, cylindrical body 12, an upper or batter head 14 that covers one end of the cylindrical body 12, and a lower or snare head 16 that covers a second end of the cylindrical body 12 and that opposes the batter head 14. Each of the heads 14 and 16 are formed of a tightly stretched membrane and each is bounded by a peripheral or retaining rim 18 and 20, respectively. Each of the rims 18 and 20 are commonly shaped to have a ridge 22 formed therein. The snare drum 10 has snares (not shown) positioned across the snare head 16 to produce a rattling or reverberating effect upon the striking of the batter head 14 with a drumstick by a musician. The snare drum 10 is typically mounted upon a stand 24, the drum 10 being set upon tripod arms 25 at a first end 26 and terminating in legs 28 usually of the tripod variety at a second end 30 that opposes the first end 26.

Figure 2:
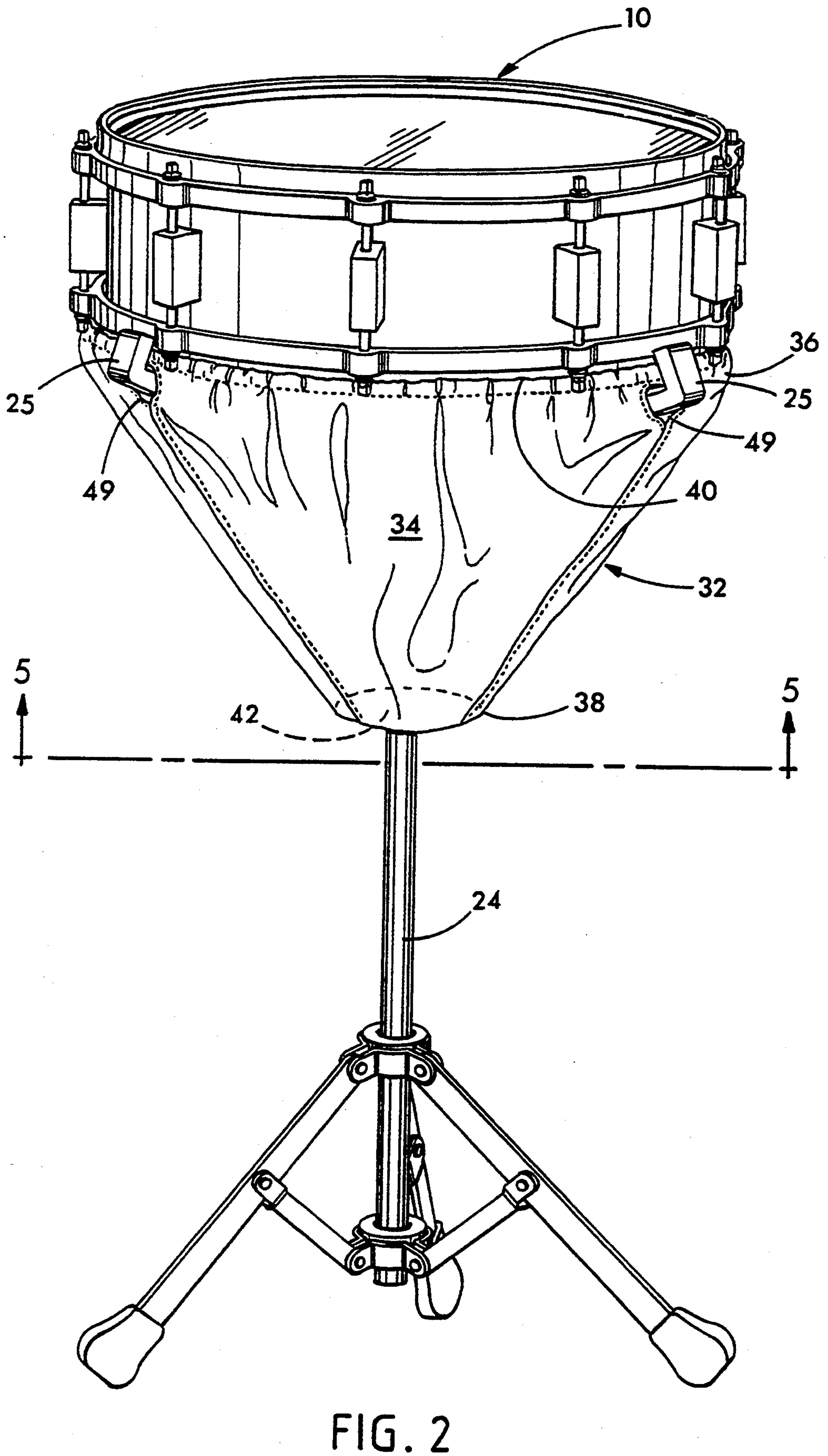
FIG. 2 is a perspective view of the drum of FIG. 1 with the apparatus of the present invention attached.
Figure 3:
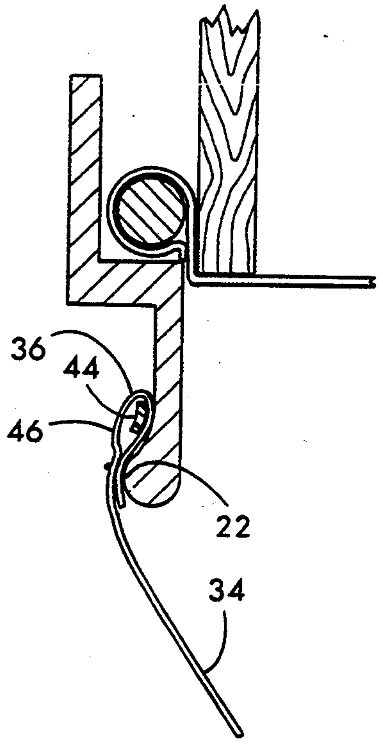
FIG. 3 is a vertical cross-section through the snare drum of FIG. 2 showing an elastic band at the first end of the apparatus stretched to fit about the peripheral rim of the snare head to attach the apparatus to the drum.
Figure 4:
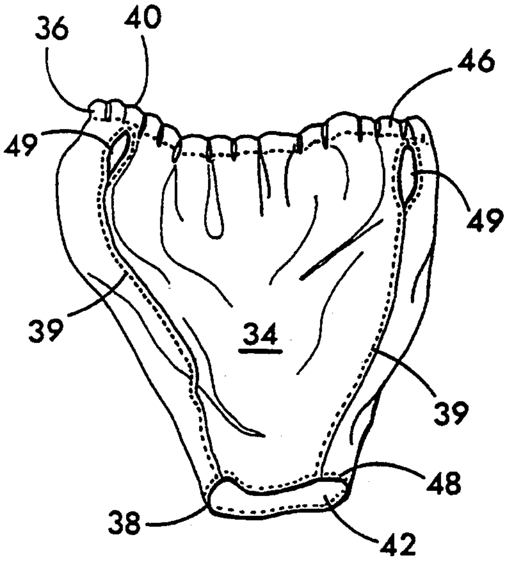
FIG. 4 is a perspective view of the apparatus of the present invention such that the apparatus is independent of and not attached to a drum and the elastic band at the first end of the apparatus is relaxed.

The apparatus of the present invention for modifying the percussive sound emanating from a drum is generally indicated at 32 in FIGS. 2 and 3 as attached to the snare drum 10. The apparatus 32 comprises a hollow skirt 34 having a first end 36 and a second end 38 that are in opposition to each other. The first and second ends 36 and 38 define openings 40 and 42, respectively, that are in communication with each other through the hollow interior of the skirt 34. The opening 40 at the first end 36 is sized to fit about the peripheral rim 20 at the snare head 16 of the snare drum 10. As shown in FIG. 3, the skirt 34 is folded over at the first end 36 to form a crease and an elastic band 44 is confined within. The edge at the first end 36 is then sewn down to form a hem 46. The opening 40 at the first end 36 is thus bordered by the elastic band 44 such that the elastic band 44 may be stretched to fit about the peripheral rim 20, thus serving as a means of securing the apparatus 32 to the snare drum 10 by tensional engagement of the elastic band 44 against the peripheral rim 20, in a manner explained in greater detail below. FIG. 4 shows the apparatus 32 not attached to and independent of the snare drum 10, the elastic band 44 at the first end 36 being in a relaxed state. When the elastic band 44 is in a relaxed state, the fabric at the mouth of the opening 40 is bunched together to allow for circumferential expansion of the opening 40 by the stretching of the elastic band 44 to fit about the peripheral rim 20. The opening 42 at the second end 38 is sized to allow insertion of the stand 30 therethrough. Similar to the first end 32, a hem 48 is sewn at the second end 38, though without having an elastic band formed therein.

The skirt 34 is generally configured such that the second end 38 is tapered with respect to the first end 36. Preferably, the skirt 34 is conical or quasi-conical in shape, the first end 36 forming the base of the conical or quasi-conical shape and the second end 38 forming the vertex of the conical or quasi-conical shape. The skirt is typically sewn together at seams 39 and made of a material having sound modifying qualities. Where the apparatus 32 is a drum muffling apparatus, suitable sound absorbent materials include canvas, linen, velour, leather or suede, and synthetic leather, though numerous other materials may be employed to produce different muted, dampened, or muffled sounds, depending on the desired tonal results. If so desired, the skirt 34 may be formed of a material that modifies the sound emanating from the drum such that the resultant sound is livelier, or with greater power and projection. It is to be understood that the invention is not limited by the material of the skirt 34 inasmuch as the material may be selected to produce any number of tonal qualities.

Figure 5:
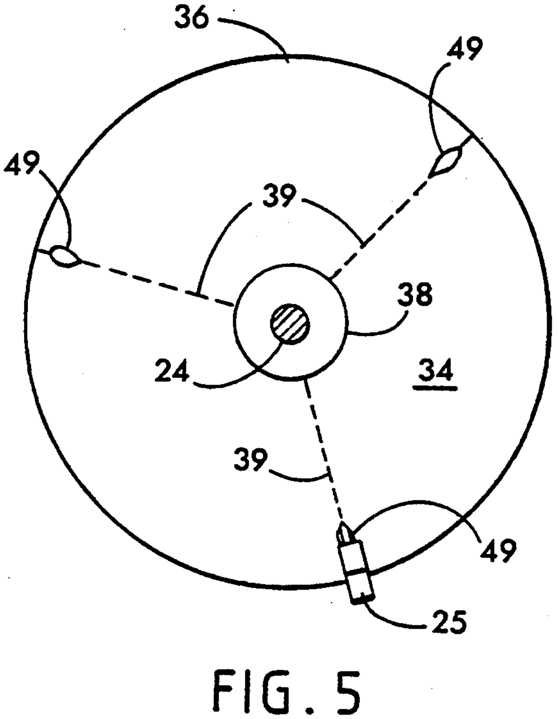
FIG. 5 is a bottom-plan view of the apparatus of the present invention taken along line 5—5 of FIG. 2.

As best seen in FIG. 5, the skirt 34 also includes three slots 49 that are located proximal the first end 36 and spaced equidistant from each other. The slots 49 are preferably located at the seams 39. The slots 49 are necessary for use in association with certain types of arms 25 that may jut out from the stand 24 to a point beyond the shape of the skirt 34 as it hangs from the peripheral rim 20. Such arms 25 therefore protrude through the slots 49. The skirt 34, however, fits over many types of arms 25 without need of the slots 49.

In the operation of the apparatus of the present invention, the skirt 34 such as depicted in FIG. 4 is secured to the drum 10 by the stretching or tensioning of the opening 40 to fit about the peripheral rim 20 of the snare head 16 such as depicted in FIG. 2. In fitting of the opening 40 about the peripheral rim 20, the elastic band 44 is positioned behind the ridge 22 and the remainder of the skirt 34 hangs from the underside of the snare head 16. Though most drums have the ridge 22 to assist in the fitting of the opening 40 about the peripheral rim 20, the tensioning of the elastic band 44 against the peripheral rim 20 is ordinarily sufficient by itself to attach the skirt 34 to the drum 10. Since most snare drums have a diameter of between 13 and 15 inches, the opening 40 is sized appropriately to fit about a peripheral rim 20 of such a range, and the elastic band 44 is tensioned to allow a secure fit to the peripheral rim 20 upon the stretching to such a size. The skirt 34 remains secure even with the force of an air column directed downward through the skirt 34, as emanated from the drum 10. Where appropriate to the arms 25, the slots 39 are properly positioned to fit about the arms 25. The stand 24 extends through the hollow interior of the skirt 34 and through the second opening 42. It should be understood from the drawings and the text, the skirt 34 may be slid over the second end 30 of the stand over the legs 28 when the legs 28 are unfolded for attachment of the opening 40 at the first end 36 to the peripheral rim 20. Alternately, the skirt 34 may be slid over the first end 26 of the stand 24 prior to the mounting of the drum 10 upon the stand 24, and the opening 40 of the skirt 34 may then be pulled up into position for securing to the drum 10 subsequent to the mounting of the drum 10 upon the stand 24.

In the use of the apparatus 32, the sound emanating from the snare head 16 by movement of an air column directed downward is modified by the echoing or muffling of the sound within the skirt 34, depending upon the material of the skirt 34 for the intended purposes. For the material of the skirt 34 is sound absorbent, the apparatus 32 acts as a muffle or mute to dampen the sound emanating from the drum 10. Where the material is selected to cause echoing or reverberation within the skirt 34, the resulted sound may be somewhat increased, or at least altered, by such echoing or reverberation. The apparatus 32 does not contact with either the batterhead 14 or the snare head 16, thus preserving the natural "feel" of the drum to the drummer inasmuch as the playing and sound generating surfaces of the heads 14 and 16 remain unaffected. Further, the attachment of the apparatus 32 to the drum 10 does not mar or otherwise adversely affect the integrity of the drum 10.

Figure 6:
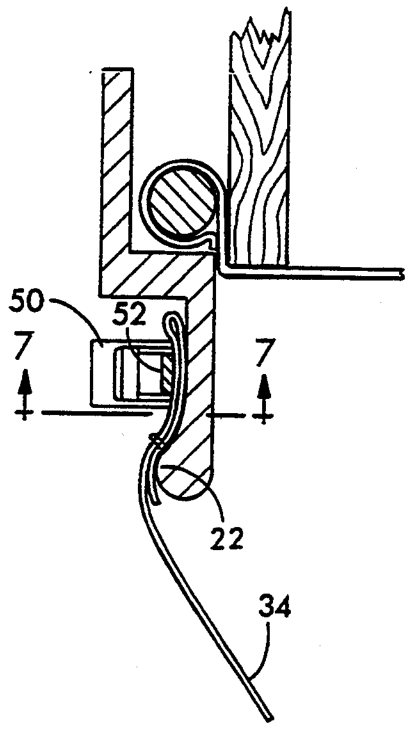
FIG. 6 is a vertical cross-section through the snare drum as in FIG. 2 showing a toggle latch as an alternate means of securing the first end of the apparatus to the peripheral rim of the snare head to attach the apparatus to the drum.
Figure 7:
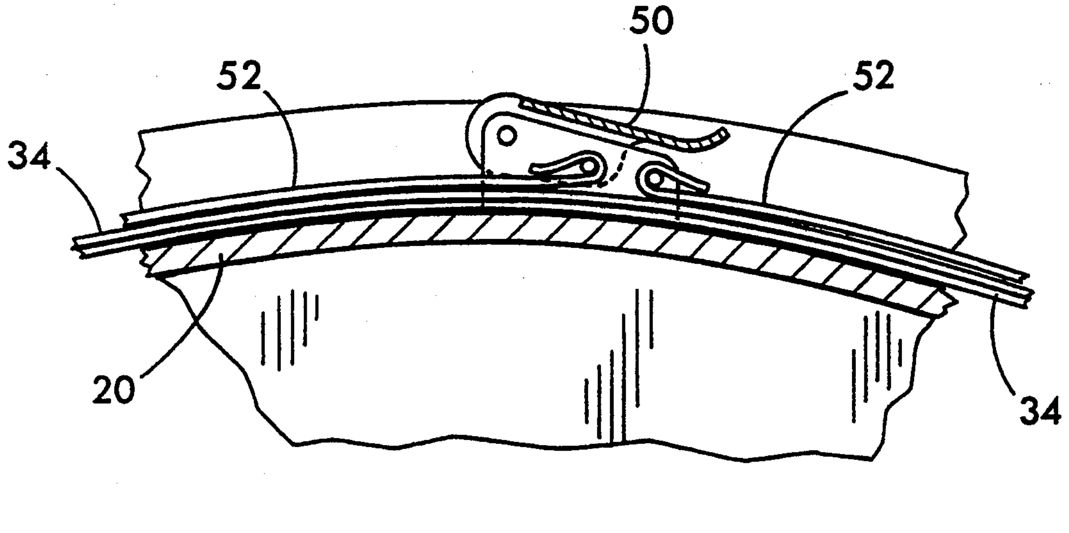
FIG. 7 is a cross-section taken along line 6—6 of FIG.

FIGS. 6 and 7 disclose an alternate means of securing the opening 40 to the peripheral rim 20 of the snare head 16. Instead of the elastic band 44 that is used to attach the skirt 32 intention to the drum 10, a toggle latch 50 as is known in the art is used to close a band 52 about the opening 40 to secure the skirt 34 to the peripheral rim 20. It is to be understood that the invention is not limited to the particular attachment means as herein shown and described, and that there may be a number of alternate methods that may be employed to secure the skirt 34 to the drum 10 and that come within the scope of this invention.

Figure 8:
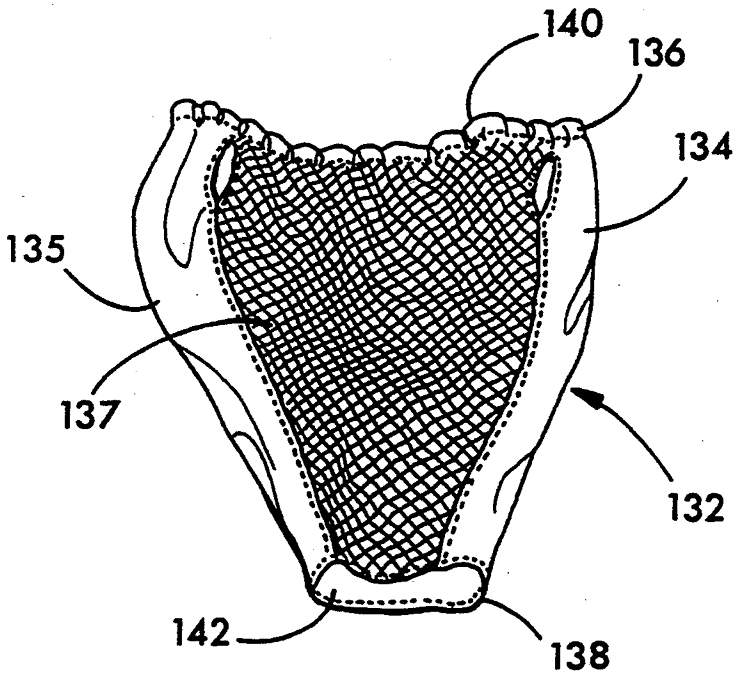
FIG. 8 is a perspective view of an alternate apparatus of the present invention that has first and second sections that each modify sound differently from each other, the apparatus being independent of and not attached to a drum and the elastic band at the first end of the apparatus is relaxed.

FIG. 8 shows an alternate apparatus 132 of the present invention having a skirt 134, first and second ends 136 and 138, and openings 140 and 142 analogous to the skirt 34, first and second ends 36 and 38, and openings 40 and 42 of the apparatus 32. The skirt 134 has first and second sections 135 and 137, the first section 135 being formed of a material that modifies sound in a manner different from the second section 137. As further depicted in FIG. 8, the first section 135 is formed of a sound absorbent material such as canvas, linen, velour, leather or suede, synthetic leather, or similar material that muffles the sound from the snare head 16 and the second section 137 is formed of an open-mesh or fishnet or screen material through which sound is readily transmitted therethrough, the skirt 134 being positionable about the peripheral rim 20 such that the sound from the snare head 16 may be selectively and substantially directed or funneled through the second section 137 in the direction that the second section 137 faces. The alternate embodiment is advantageous where it is desired to mute or dampen the sound emanating from the drum in certain regions of a room, hall, or studio, but not in others.

It is understood that the invention is not confined to the particular construction and arrangement of parts herein illustrated and described, but embraces such modified forms thereof has come within the scope of the following claims.

What is claimed is:

1. An apparatus for modifying a percussive sound emanating from a drum, the apparatus being attachable to a drum having a batter head and a snare head, the batter head and the snare head each being formed of a tightly stretched membrane and being bounded by a peripheral rim, the apparatus comprising a flexible hollow skirt having a first end and a second end in opposition to each other, the first end defining a first opening and the second end defining a second opening that are in communication with each other, the first opening being sized to conformably fit about and be readily removed from the peripheral rim of the snare head without contacting the tightly stretched membrane of the snare head and the second opening being sized to allow a stand for the drum to pass therethrough, the skirt having a shape such that the second end is tapered with respect to the first end and that funnels the percussive sound from the snare head therethrough, wherein the skirt has a first section and a second section, the first section being formed of a material that modifies the percussive sound in a manner different from the second section and further wherein the first section is formed of a sound absorbent material that muffles the percussive sound from the snare head and the second section is formed of an open-mesh weave material through which the percussive sound is readily transmitted therethrough, the skirt being positionable about the peripheral rim such that the percussive sound from the snare head is substantially directed through the second section in a direction that the second section faces.

2. The apparatus of claim 1 wherein the skirt is substantially conical in shape, the first end forming the base of the substantially conical shape and the second end forming the vertex of the substantially conical shape.

3. The apparatus of claim 1 wherein the opening at the first end is bordered by an elastic band that stretches to fit about the peripheral rim of the snare head to attach the apparatus to the drum.

4. The apparatus of claim 1 wherein the opening at the first end has a latch that is closable about the peripheral rim of the snare head to attach the apparatus to the drum.

5. A drum muffling apparatus that is attachable to a drum having a batter head and a snare head, the batter head and the snare head each being formed of a tightly stretched membrane and being bounded by a peripheral rim, the drum muffling apparatus comprising a flexible hollow skirt of sound absorbent material having a first end and a second end in opposition to each other, the first opening being sized to conformably fit about and be readily removed from the peripheral rim of the snare head without contacting the tightly stretched membrane of the snare head and the second opening being sized to allow a stand for the drum to pass therethrough, the skirt having a shape such that the second end is tapered with respect to the first end and that funnels a percussive sound from the snare head therethrough, wherein the skirt has a first section and a second section, the first section being formed of a material that modifies percussive sound in a manner different from the second section and further wherein the first section is formed of a sound absorbent material that muffles the percussive sound from the snare head and the second section is formed of an open-mesh weave material through which the percussive sound is readily transmitted therethrough, the skirt being positionable about the peripheral rim such that the percussive sound from the snare head is substantially directed through the second section in a direction that the second section faces.

6. The apparatus of claim 5 wherein the skirt is substantially conical in shape, the first end forming the base of the substantially conical shape and the second end forming the vertex of the substantially conical shape.

7. The apparatus of claim 5 wherein the opening at the first end is bordered by an elastic band that stretches to fit about the peripheral rim of the snare head to attach the apparatus to the drum.

8. The apparatus of claim 5 wherein the opening at the first end has a latch that is closable about the peripheral rim of the snare head to attach the apparatus to the drum.

9. An apparatus for modifying a percussive sound emanating from a drum, the apparatus being attachable to a drum having a batter head and a snare head, the batter head and the snare head each being formed of a tightly stretched membrane and being bounded by a peripheral rim, the apparatus comprising a substantially conical, flexible hollow skirt having a first end and a second end in opposition to each other, the first end defining a first opening and the second end defining a second opening that are in communication with each other, the first opening being sized to conformably fit about and be readily removed from the peripheral rim of the snare head without contacting the tightly stretched membrane of the snare head and the second opening being sized to allow a stand for the drum to pass therethrough, the skirt having a substantially conical shape such that the second end forms a vertex of the substantially conical shape and the first end forms a base of the substantially conical shape, the skirt funneling the percussive sound from the snare head therethrough, wherein the skirt has a first section and a second section, the first section being formed of a material that modifies percussive sound in a manner different from the second section and wherein the first section is formed of a sound absorbent material that muffles the percussive sound from the snare head and the second section is formed of an open-mesh weave material through which percussive sound is readily transmitted therethrough, the skirt being positionable about the peripheral rim such that the percussive sound from the snare head is substantially directed through the second section in a direction that the second section faces, and further wherein the opening at the first end is bordered by an elastic band that stretches to fit about the peripheral rim of the snare head to attach the apparatus to the drum.

* * * * *